(12) United States Patent
Winter (10) Patent No.: US 6,678,008 B1
(45) Date of Patent: Jan. 13, 2004

(54) APPARATUS FOR GENERATING A DIGITAL VIDEO PICTURE

(75) Inventor: Marco Winter, Hannover (DE)

(73) Assignee: Thomson Licensing S.A., Boulogne Cedex (FR)

( * ) Notice: Subject to any disclaimer, the term of this patent is extended or adjusted under 35 U.S.C. 154(b) by 0 days.

(21) Appl. No.: 09/554,644

(22) PCT Filed: Nov. 18, 1998

(86) PCT No.: PCT/EP98/07399

§ 371 (c)(1),
(2), (4) Date: May 17, 2000

(87) PCT Pub. No.: WO99/29104

PCT Pub. Date: Jun. 10, 1999

(30) Foreign Application Priority Data

Nov. 27, 1997 (DE) .......................... 197 52 507

(51) Int. Cl.⁷ ............................... H04N 5/45
(52) U.S. Cl. ...................... 348/565; 348/569
(58) Field of Search ............... 348/564–569, 348/588, 468, 589, 600, 598, 385.1; 725/39–43

(56) References Cited

U.S. PATENT DOCUMENTS

| | | | | |
|---|---|---|---|---|
| 4,998,171 A | * | 3/1991 | Kim et al. ............ | 358/183 |
| 5,008,740 A | * | 4/1991 | Phillips et al. ........ | 358/23 |
| 5,434,626 A | * | 7/1995 | Hayashi et al. ....... | 348/569 |
| 5,657,092 A | | 8/1997 | Kim ..................... | 348/565 |
| 5,995,160 A | * | 11/1999 | Rumreich ............. | 348/564 |
| 6,041,068 A | * | 3/2000 | Rosengren et al. .... | 370/538 |
| 6,166,778 A | * | 12/2000 | Yamamoto et al. .... | 348/569 |
| 6,367,080 B1 | * | 4/2002 | Enomoto et al. ...... | 725/112 |
| 6,411,337 B2 | * | 6/2002 | Cove et al. ........... | 348/563 |

FOREIGN PATENT DOCUMENTS

| | | | | |
|---|---|---|---|---|
| EP | 0725541 | 8/1996 | ......... | H04N/5/92 |
| EP | 0805591 | 11/1997 | ......... | H04N/7/12 |

* cited by examiner

Primary Examiner—Victor R. Kostak
(74) Attorney, Agent, or Firm—Joseph S. Tripoli; Harvey D. Fried; Francis A. Davenport (57) ABSTRACT

An apparatus for generating a digital video picture is proposed. In this case, the video picture comprises a main picture and a secondary picture. The secondary picture serves to provide information about the status of the apparatus or else for operational guidance. The data of the picture are supplied digitally. Data for the subpicture are additionally contained in the bit stream for the main picture. The subpicture can likewise be displayed together with the main picture and provide information such as, for example, subtitles with respect to the main picture. Decoding apparatuses for the main-picture data and the subpicture data are provided. Also provided is a multiplexing device for the correctly timed outputting of the decoded data and, consequently, of the joint representation of main picture and subpicture. The apparatus has a storage device, in which data for the secondary pictures are stored in coded form. The coded data of a secondary picture are loaded into the decoding unit for the subpicture data in response to a received command. The decoding of the data for the subpicture is stopped and the decoding of the data for the secondary picture takes place instead. In a further refinement of the invention, provision is additionally made of a second subpicture decoding device, which is used for the decoding of the displayable secondary pictures. In this case, subpicture and secondary picture can then be inserted simultaneously in the video picture.

8 Claims, 7 Drawing Sheets

| | | |
|---|---|---|
| · · · · · · · · · · · · · 13BP | 34H | |
| · · · · · ✱✱✱ · · · · · 5BP + 3PP + 5BP | 14H D1H 40H | |
| · · · · · ✱✱✱ · · · · · 5BP + 3PP + 5BP | 14H D1H 40H | |
| · · · · · ✱✱✱ · · · · · 5BP + 3PP + 5BP | 14H D1H 40H | |
| · · · · · ✱✱✱ · · · · · 5BP + 3PP + 5BP | 14H D1H 40H | |
| · · · · · ✱✱✱ · · · · · 5BP + 3PP + 5BP | 14H D1H 40H | |
| · · · · · ✱✱✱ · · · · · 5BP + 3PP + 5BP | 14H D1H 40H | |
| · · · · · · · · · · · · · 13BP | 34H | |
| | | |
| · · · · · · · · · · · · · 13BP | 34H | |
| · · · · ✱ · · · · · · · · 4BP + 1PP + 8BP | 10H 52H 00H | |
| · · · · ✱✱ · · · · · · · 4BP + 2PP + 7BP | 10H 91H C0H | |
| · · · · ✱✱✱ · · · · · · 4BP + 3PP + 6BP | 10H D1H 80H | |
| · · · · ✱✱✱✱ · · · · · 4BP + 4PP + 5BP | 10H 11H 14H | |
| · · · · ✱✱✱ · · · · · · 4BP + 3PP + 6BP | 10H D1H 80H | |
| · · · · ✱✱ · · · · · · · 4BP + 2PP + 7BP | 10H 91H C0H | |
| · · · · ✱ · · · · · · · · 4BP + 1PP + 8BP | 10H 52H 00H | |
| · · · · · · · · · · · · · 13BP | 34H | |
| | | |
| · · · · · · · · · · · · · 13BP | 34H | |
| · · ✱ · · · · ✱ · · · · · 2BP + 1PP + 4BP + 1PP + 5BP | 85H 10H 51H 40H | |
| · · ✱✱ · · · ✱✱ · · · · 2BP + 2PP + 3BP + 2PP + 4BP | 89H C9H 10H | |
| · · ✱✱✱ · · ✱✱✱ · · · 2BP + 3PP + 2BP + 3PP + 3BP | 8DH 8DH C0H | |
| · · ✱✱✱✱ · ✱✱✱✱ · · 2BP + 4PP + 1BP + 4PP + 2BP | 81H 14H 11H 80H | |
| · · ✱✱✱ · · ✱✱✱ · · · 2BP + 3PP + 2BP + 3PP + 3BP | 8DH 8DH C0H | |
| · · ✱✱ · · · ✱✱ · · · · 2BP + 2PP + 3BP + 2PP + 4BP | 89H C9H 10H | |
| · · ✱ · · · · ✱ · · · · · 2BP + 1PP + 4BP + 1PP + 5BP | 85H 10H 51H 40H | |
| · · · · · · · · · · · · · 13BP | 34H | |
| | | |
| · · · · · · · · · · · · · 13BP | 34H | |
| · · · · ✱ · · · ✱ · · · · 4BP + 1PP + 3PP + 1PP + 4BP | 10H 5CH 51H 00H | |
| · · · · ✱✱ · · ✱ · · · · 4BP + 2PP + 2BP + 1PP + 4BP | 10H 98H 51H 00H | |
| · · · · ✱✱✱ · ✱ · · · · 4BP + 3PP + 1BP + 1PP + 4BP | 10H D4H 51H 00H | |
| · · · · ✱✱✱✱✱ · · · · 4BP + 5PP + 4BP | 10H 15H 10H | |
| · · · · ✱✱✱ · ✱ · · · · 4BP + 3PP + 1BP + 1PP + 4BP | 10H D4H 51H 00H | |
| · · · · ✱✱ · · ✱ · · · · 4BP + 2PP + 2BP + 1PP + 4BP | 10H 98H 51H 00H | |
| · · · · ✱ · · · ✱ · · · · 4BP + 1PP + 3BP + 1PP + 4BP | 10H 5CH 51H 00H | |
| · · · · · · · · · · · · · 13BP | 34H | |

Fig.5

|  | Addr: | SPU-Bytes (hexadecimal) | | | | | | # Commentary (decimal) |
|---|---|---|---|---|---|---|---|---|
| SPUH { | 0000: | 00 | 33 | | | | | # SPDSZ = 51 |
| | 0002: | 00 | 1B | | | | | # SP_DCSQTA = 27 |
| | | | | | | | | # PXD |
| | 0004: | 34 | 14 | D1 | 40 | | | |
| | 0008: | 14 | D1 | 40 | 14 | | | |
| PXD { | 000C: | D1 | 40 | 14 | D1 | | | |
| | 0010: | 40 | 14 | D1 | 40 | | | |
| | 0014: | 14 | D1 | 40 | 14 | | | |
| | 0018: | D1 | 40 | 34 | | | | |
| | 001B: | 00 | 00 | | | | | # SP_DCSQ_STM |
| | 001D: | 00 | 1B | | | | | # SP_NXT_DCSQ_SA=27 |
| | 001F: | 03 | 32 | 10 | | | | # SET_COLOR |
| SP_DCSQT { | 0022: | 04 | FF | FF | | | | # SET_CONTR |
| | 0025: | 05 | 20 | 02 | 0C | 03 | 00 | 37 # SET_DAREA |
| | 002C: | 06 | 00 | 04 | 00 | 0E | | # SET_DSPXA |
| | 0031: | 01 | | | | | | # STA_DSP |
| | 0032: | FF | | | | | | # CMD_END |

APPARATUS FOR GENERATING A DIGITAL VIDEO PICTURE

The invention relates to an apparatus for generating a digital video picture, the video picture being composed of a plurality of components, in particular main picture and secondary picture.

BACKGROUND OF THE INVENTION

The invention is based on an apparatus for generating a digital video picture of the generic type of the independent claims 1 and 2. In video technology, it is known to provide so-called subpicture decoding devices, for example in a DVD playback device, for displaying for example subtitles on the screen of a television set. DVD playback devices of this type are already commercially available and contain the abovementioned subpicture decoding device. However, such subpicture decoding devices also come into consideration in the context of receivers for digital television (set-top box). The abovementioned subpicture decoding units are already commercially available and correspondingly known to the relevant person skilled in the art. A description of the subpicture decoding devices is found, moreover, in the DVD standard DVD Specifications for Read-Only Disc, Part 3, Video Specification, Version 1.0, Aug. 96, 5.4.3 Sub Picture Unit (SPU). A detailed description of such subpicture decoding devices is also found in EP-A-0 725 541.

In the case of the abovementioned electronic equipment (DVD playback device and set-top box), it is customary, as in the case of other equipment appertaining to consumer electronics, too, to insert status information from the respective equipment in the output video picture. In addition, the use of so-called on-screen display menus (OSD) for operational guidance is widespread. Such menus relate for example to the setting of the volume in the case of a television set with the aid of a displayed bar indicator, the setting of balance, colour contrast, brightness, etc. in the case of a television set, the selection of a programme location by means of a displayed table with regard to the stored TV programme locations in the case of a television receiver, specific menus for the programming of a video recorder and so on. In order to generate such OSD menus or else status displays, use is nowadays usually made of specialized microcontroller circuits with internal or external ROM and RAM memories. These circuits are usually designed in such a way that the dot matrix-like pattern for each displayable character is stored in the ROM memory. Graphics characters with the aid of which, for example, the corresponding bar charts can be composed may also be mentioned as displayable characters. For an OSD menu, the requisite character codes are then transferred to a character generator, which removes the associated dot matrix data from the ROM and generates the associated RGB signals at the correct locations in the picture and inserts them in the picture. The solution can also be configured for equipment with digital signal processing (including digital frame store) in such a way that the pixel data are generated individually by the character generator and written to the frame store at the corresponding locations.

If such a conventional OSD circuit is additionally used for the insertion of status information and menus for operational guidance in the abovementioned equipment (DVD playback device, set-top box, etc.), then the problem arises that not only the already mentioned subpicture decoding unit must be implemented with hardware outlay but also the OSD circuit. This causes increased costs in the development of the equipment since it is necessary to develop and adapt two very different circuits for the insertion of subpictures/secondary pictures.

SUMMARY OF THE INVENTION

An inventive arrangement reduces costs associated with providing circuitry for generating operational menus and status information in equipment with an integrated subpicture decoding unit. In a first inventive arrangement an existing subpicture decoding unit is, in addition, advantageously used for generating status information or operating menus. To this end, it is provided that the equipment has a storage device in which the data for the displayable status information or operating menus are stored in a correspondingly coded form. The data for such secondary pictures are loaded into the subpicture decoding unit, following a request by means of a corresponding command, and are then decoded in the decoding unit after the decoding of data for a possibly activated, different subpicture (for example subtitles) has been stopped. In the case of this solution, then, the insertion of subtitles is suppressed and, instead, the secondary picture with the status information or the operating menus is displayed. However, this is not necessarily disadvantageous since the user generating the exemplary menu command will wish to view the operating menu in any case.

In a second solution according to the invention, a second subpicture decoding unit for the status information and operating menus is provided in addition to the subpicture decoding unit for the outputting of the subtitles. Both subpicture decoding units may be constructed similarly because the data for the operating menus and status information are coded according to the same coding rules as the data for the subtitles. Although it is necessary to provide a second subpicture decoding unit in this solution, the implementation outlay is considerably reduced since both subpicture decoding units are constructed similarly. The advantage of this solution consists principally in the fact that subtitles and operating menus and/or status information can be inserted simultaneously in the video picture. This is advantageous particularly when status information such as, for example, time of day, playing time, date, remaining playing time, etc. are to be added to the picture.

In a third solution according to the invention the two separate subpicture decoding units of the second solution are combined to form a common decoding unit. However, this presupposes that the subpicture decoding unit has sufficient memory to store the data of two different subpictures and to process the data successively with correct timing throughout the duration of a video frame or field.

The following holds true for all three solutions: if only simple OSD menus are intended to be displayed, for example the insertion of simple symbols for the display of the operating mode, it is not absolutely necessary to load the data of the subpicture units into the subpicture decoding units if the subpicture decoding devices are designed in such a way that they can decode the associated data directly from the non-volatile memory (ROM).

The solutions according to the invention have the following advantages in addition to the advantages already mentioned. The data for a subpicture contain, firstly, the so-called bit map data for the subpicture and, secondly, the so-called display control command sequences. By virtue of the fact that bit map data for the subpictures are used, practically any desired configurations are easily possible for the OSD menus. It is also advantageous that the bit map data are run length coded. This saves memory space.

The fact that the subpicture decoding unit decodes the bit map data in a line-oriented manner means that it is not necessary to buffer-store the entire decoded subpicture in a memory. This also saves memory space.

DRAWINGS

Exemplary embodiments of the invention are illustrated in the drawings and are explained in more detail in the description below.

In the figures:

FIG. 5 shows four examples of status information items and associated run length coding words;

DESCRIPTION OF THE INVENTION

Figure 1:
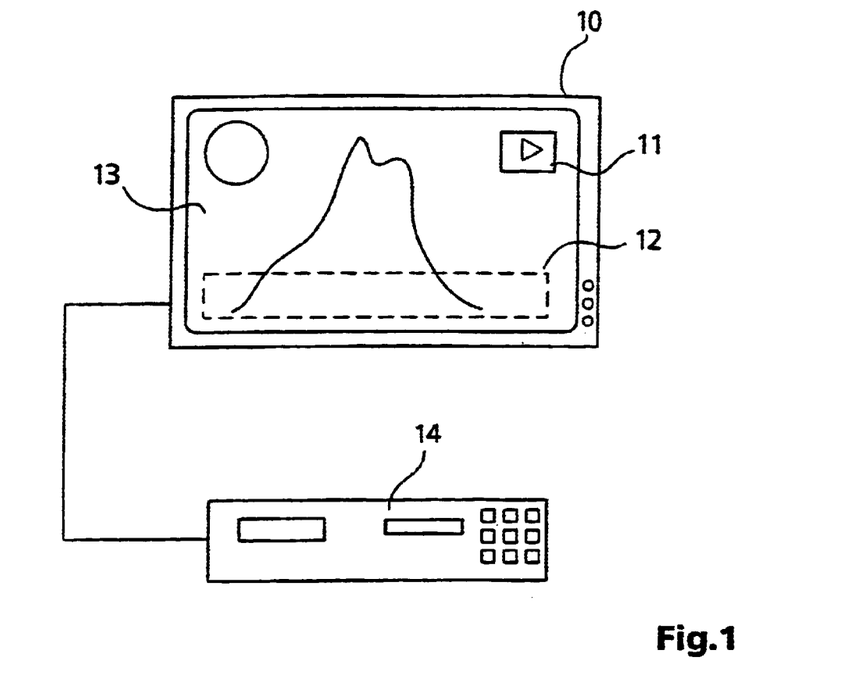
FIG. 1 shows the display of a subpicture and of a status information item on the screen of a television receiver.

In FIG. 1, the reference numeral 10 designates a conventional TV set. The reference numeral 14 designates a DVD playback device. The latter is connected to the TV set 10 via a coaxial lead, for example. The DVD playback device 14 generates the analog television signal which is fed, for example, to the TV set 10 via the antenna socket. The reference numeral 13 designates the main picture or background picture. The reference numeral 11 designates an inserted secondary picture, which conveys the status information depicting, for example a "playback mode" for the DVD playback device 14. The reference numeral 12 designates an inserted subpicture, which is provided for displaying subtitles. This inserted subpicture is illustrated by dashed lines since, in accordance with the first solution according to the invention, it would not be visible at the same time as the secondary picture 11.

Figure 2:
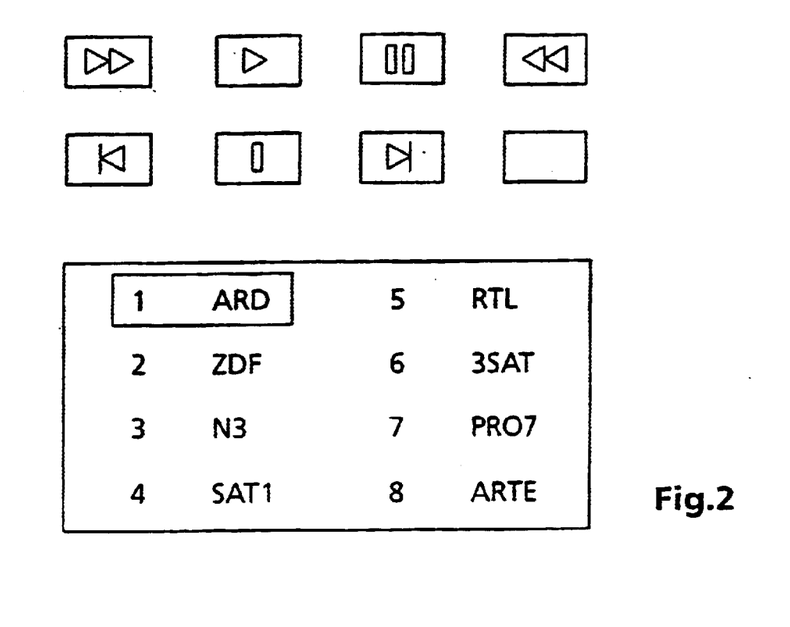
FIG. 2 shows examples of different status information items and an operating menu.

Examples of inserted secondary pictures are shown in FIG. 2, with symbols for playback mode, stop mode, pause mode, fast-forward mode, fast-reverse mode, skip forward, skip backward, playing time, time of day and date as examples of status information items. Furthermore, the lower part of the FIG. 2 illustrates a programme location table as an example of an operating menu. The currently set programme location is emphasized by a background. This operating menu may be provided for example for an item of equipment for receiving digital television signals (set-top box).

Figure 3:
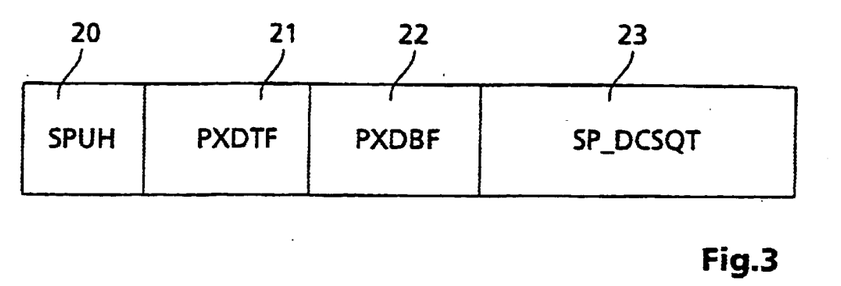
FIG. 3 shows an example of a frame format for the data of a subpicture.

FIG. 3 gives a rough illustration of the known data format of a so-called subpicture unit (SPU). Such a subpicture unit is respectively provided for a subtitle in the picture. The reference numeral 20 designates a data field for a header (SPUH) of the subpicture unit. The reference numeral 21 designates a data field for the compressed pixel data of a first field of the subpicture (PXDTF), and the reference numeral 22 correspondingly designates a data field for the compressed pixel data (PXDBF) of the second field of the subpicture. Finally, the reference numeral 23 designates a data field for a display control command sequence table (SP_DCSQT). So-called display control command sequences (SP_DCSQ) are stored in the data field 23. The arrangement of the PXDTF and PXDBF data is one possible example of such an arrangement. It may also be chosen differently, however. The individual display control commands will not be discussed in more detail in this patent application because they are individually explained with a high degree of accuracy for example in the known DVD standard (Version 1.0), with the result that, therefore, reference is expressly made to this publication for the disclosure of the invention.

The pixel data in the data fields 21 and 22 determine the displayed pattern of the subpicture. For each pixel of a line of the subpicture, a data word two bits wide specifies whether the pixel is a background pixel or a foreground pixel or whether the picture is to be highlighted in a first manner or in a second manner. These four distinctions can be made using the two bits. Specifically, these binary values denote: 00=background pixel, 01=foreground pixel, 10=pixel displayed with highlighting 1, and 11=pixel displayed with highlighting 2.

It must be taken into account here that the individual pixel data are not stored in this pure form in the memory, but rather in compressed form. Run length coding is carried out for this purpose. The run length coding method is explained in more detail below with reference to FIG. 4.

Figure 4:
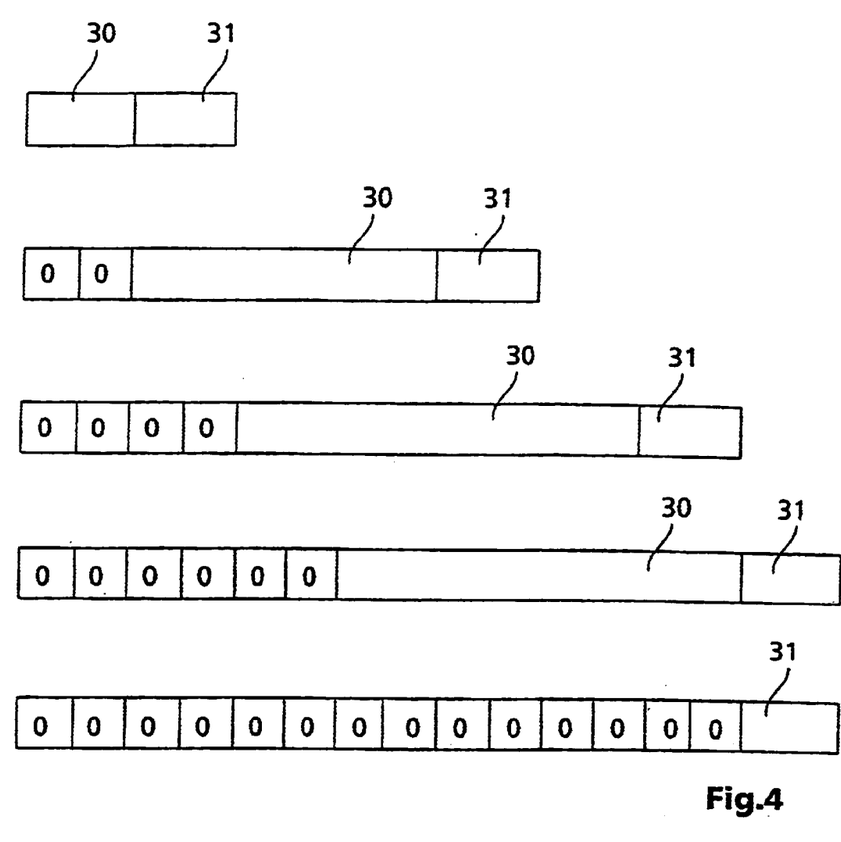
FIG. 4 shows a diagrammatic illustration of the rules for run length coding of the pixel data of a line of a subpicture.

Seven coding rules are stipulated for run length coding in the DVD standard mentioned. The run length coding operates such that a respective line of a field of the subpicture to be displayed is run length coded. The first rule for run length coding reads as follows:

1. If one to three pixels having the same data word follow one another in the line, then the number of pixels is entered in the first two bits of the first run length coding word and the pixel data word is entered in the succeeding two bits. Four bits are then regarded as a unit. This is illustrated in the top part of FIG. 3. The reference numeral 30 designates the data field for the number of pixels, which data field has a memory space for two bits. The reference numeral 31, on the other hand, designates the data field for the type of pixel, that is to say the data word of the pixels. This data field likewise has a length of two bits.

The second rule for run length coding reads as follows:

2. If four to fifteen pixels having the same data word follow one another, then a zero is entered in the first two bits of a run length coding word, and the number of pixels is entered in the next four bits, and the type of pixel is again entered in the last two bits. This results in a run length coding word having a length of eight bits corresponding to the second part of FIG. 4.

The third rule for run length coding reads as follows:

3. If sixteen to sixty-three pixels having the same value follow one another, then a zero is entered in the first four bits of the run length coding word and the number of pixels is entered in the next six bits that follow. The type of pixel is again entered in the last two bits. This produces a run length coding word having a length of twelve bits. This is illustrated in the middle part of FIG. 3.

The fourth rule for run length coding reads as follows:

4. If sixty-four to two hundred and fifty-five pixels having the same value follow one another, then a zero is entered in the first six bits of the run length coding word, and the number of pixels is entered in the following eight bit positions, and the type of pixel is entered in the next two bits. This produces a run length coding word having a width of sixteen bits, which is illustrated at the penultimate position in FIG. 3.

The fifth rule for run length coding reads as follows:

5. If the same type of pixel runs right to the end of the line, then a zero is entered in the first fourteen bit positions and the type of following pixel is entered in the last two bit positions. This again produces a run length coding word having a width of sixteen bits, which is regarded as a unit. This word is illustrated in the last part of FIG. 4.

The sixth rule for run length coding reads as follows:

6. If, on the basis of the run length coding, no integral byte division of the run length coding words is possible for the entire line, then, at the end of the line, four zeros are entered in the last bit positions.

Further, the following is used as the last rule for run length coding:

7. The quantity of run length coded data within a line shall correspond to one thousand four hundred and forty bits or less.

Given simple picture contents, a large degree of compression is achieved by the run length coding. Examples of run length coding words are specified in FIG. 5. Four examples of status information items of a DVD playback device are illustrated in this case. They are, from top to bottom, the status information items of stop mode, playback mode, fast forward mode and skip forward. The associated symbols to be displayed are respectively specified in the left-hand part of FIG. 5. All of the symbols comprise 9×13 pixels. Asterisks represent respective pixels that are to be coded as a foreground pixel. Dots represent the background element. The form in which the run length coding was carried out for each line of the symbols is in each case specified on the right next to the respective line. In this case, the abbreviation BP denotes background pixel. The abbreviation PP correspondingly denotes foreground pixel (pattern pixel).

The resulting data bits for the run length code are then in each case specified in hexadecimal nearest decimal notation at the right-hand edge of FIG. 5. These data, associated with at least one display control command sequence (SP_DCSQ) in which the associated symbol is placed into the top right corner of the screen, represent the data of an associated subpicture unit.

Figure 6:
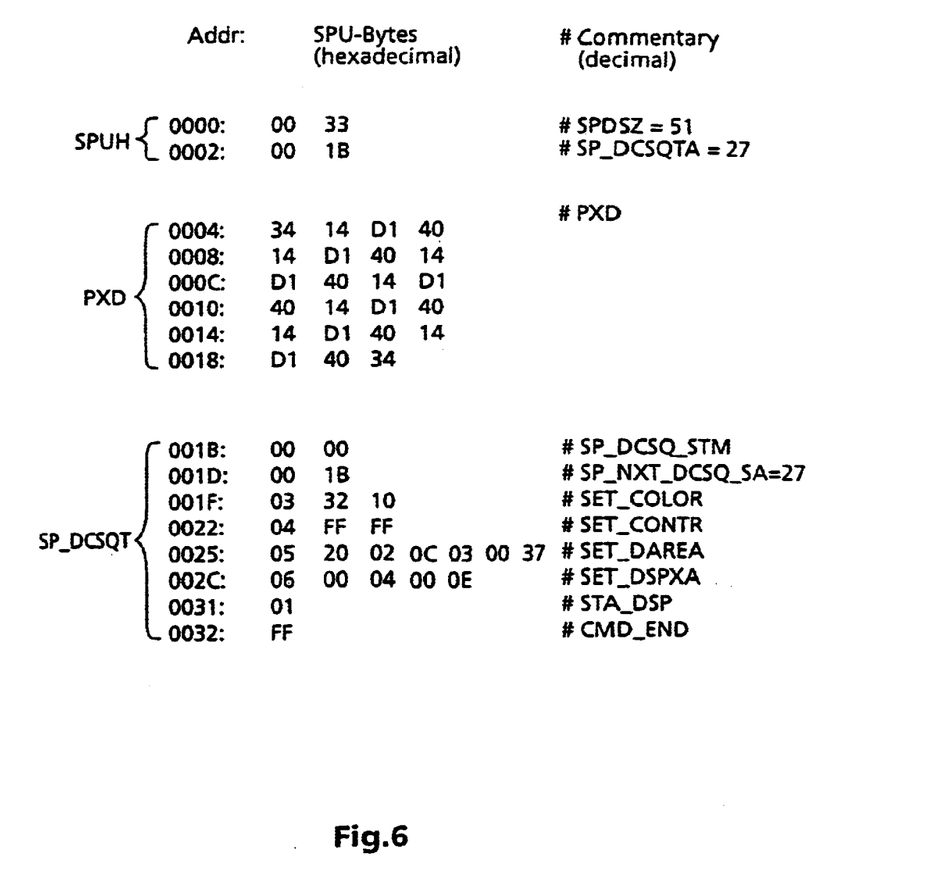
FIG. 6 shows an example of a subpicture unit which is used to insert a stop symbol on the screen.

An example of a program for inserting the stop symbol in accordance with FIG. 5 on the screen is illustrated in FIG. 6. The part designated by SPUH corresponds to the header of the subpicture unit. The size of the subpicture unit is specified therein by the command SPDSZ. All of the numbers in the left-hand part of FIG. 6 are hexadecimal numbers. Decimal numbers are specified in the right-hand part of FIG. 6. The start of the programme area for the display control commands is specified by the command SP_DCSQTA. The PXD area contains the bit map data for the stop symbol (see FIG. 5). The first and second fields are listed one after the other in this area. The data for lines 1, 3, 5 and 7 corresponding to the first field come first and then the data for lines 2, 4, 6 and 8 corresponding to the second field.

The display control commands are successively listed in the area SP_DCSQT. The command SP_DCSQ_STM defines the instant at which the display control command sequence is to be processed. This example contains merely one display control command sequence, which is started directly after the start of the subpicture unit. The command SP_NXT_DCSQ_SA points to the beginning of the next display control command sequence. In this example, the beginning of the single display control command sequence is specified here, with the result that the display control command sequence is endlessly repeated. The colour of the pixels of the subpicture unit for background and foreground etc. is defined by the command SET_COLOR. The next command SET_CONTR sets the contrast for the pixels of the subpicture unit. The command SET_DAREA specifies the x and y coordinates for the start and end points of the displayed rectangular area in the picture. The command SET_DSPXA specifies the beginning of the area with the bit map data for the first and second fields. The display of the symbol to be displayed is started by the command STA_DSP. The end command CMD_END indicates the end of the display control command sequence. As already mentioned, in the example illustrated, the display control command sequence is endlessly repeated, until the subpicture unit SPU is stopped by timeout or by external intervention in a control register of the subpicture decoding unit on the part of the external CPU. The user can initiate this action, for example, by pressing a key on the remote control.

A first block diagram of the arrangement according to the invention will now be explained with reference to FIG. 7. The reference numeral 41 designates a serial data input. Here, a bit stream is present which contains both video data and audio data as well as the data for the subtitles to be displayed. The data may either have been read from an optical storage disk (DVD) or have been received via an antenna/satellite antenna or a broadband cable from a broadcasting station. The apparatus would be used in a DVD playback device in the first case, and in a satellite receiver or a set-top box for digital television reception in the other cases. The incoming data are then first of all subjected to error detection and correction in a correction unit 42. The data subsequently pass into a separator circuit 43, in which the video, audio and subpicture data, which are still mixed together, are separated and are in each case transferred accordingly either to a video decoding unit 44, a subpicture decoding unit 45 or an audio decoding unit 46. The decoded video and subpicture data are input into a multiplexing unit 47. The multiplexing unit 47 is controlled by the subpicture decoding unit 45. At the output of the multiplexing unit 47, the data for the individual pixels of the video picture are successively entered into a TV signal coding device 48. At the outputs of the TV signal coding device, the standard-conforming luminance and chrominance signal (Y,C) is output in digital form (PAL, SECAM, NTSC). These signals are subsequently converted into analog signals in the digital/analog conversion unit 49 and forwarded to corresponding outputs 56, 65. The associated audio signal is already generated in a standard-conforming manner in the decoding device 46 and is converted into an analog audio signal (only a mono signal is illustrated here) in the digital/analog conversion unit 50. This audio signal is made available at the output 58.

The design may, on the other hand, also be such that the analog luminance and chrominance signal and the audio signal are modulated onto different carriers in a modulation unit 51 and output as a corresponding TV signal via just one output 57.

In addition, an infrared input is designated by the reference numeral 52. This input is used to receive the infrared signals from a remote control unit. The corresponding interface circuit which analyses the received infrared signals is designated by the reference numeral 53. The reference numeral 54 designates a microcontroller. The latter also receives the conditioned command words from the infrared interface 53. The microcontroller 54 also serves to control the units 42–46 via a corresponding control bus. Control is effected for example by the abovementioned units being initialized to specific starting values. In the event of an IR command the input which activates the ۞fast forward۞, for example, the microcontroller 54 forwards the corresponding control signals to the drive of the DVD playback device. Furthermore, the microcontroller 54 reads from the ROM memory 55 the associated subpicture unit for the display of the symbol for the fast forward mode. The microcontroller 54 then notifies the subpicture decoding unit 45, via the control bus, that the display of the last valid subpicture must be stopped. The microcontroller 54 then loads the new subpicture unit for the symbol to be displayed via a separate databus into the internal memory of the subpicture decoding unit 45. The newly loaded subpicture unit is then simultaneously started via the control bus. The subpicture decoding unit then inserts the decoded data at the preprogrammed locations into the bit stream for the entire video picture. For this purpose, the subpicture decoding unit 45 drives the multiplexing unit 47 with correct timing in accordance with the signals for the horizontal and vertical sync pulses, which signals are input into it from the TV signal coding device 48, and the pixel clock signal. Further details regarding the structure and the method of operation of the subpicture decoding unit 45 are contained in EP-A-0 725 541. In this regard, therefore, reference is expressly made to this document.

It should also be mentioned that for the case of operational menus or status displays with dynamic contents, only the rough framework of the subpicture is stored in the ROM 55 in each case and it is necessary for the respective subpicture unit to be additionally supplemented in the microcontroller 54. For this purpose, there must be sufficient read/write memory space in the mircocontroller 54. In the event of displaying the time of day, therefore, the pixel data for the respectively valid numbers must additionally be inserted in each case. This purpose may be served by the use of the invention according to the applicant's German Patent Application DE 196 53 071.7. The latter discloses, namely, how the run length coding of a subpicture must be carried out in order that variable parts in the subpicture (such as, for example, letters and numbers) can easily be exchanged without decoding of the pixel data having to be carried out.

Figure 8:
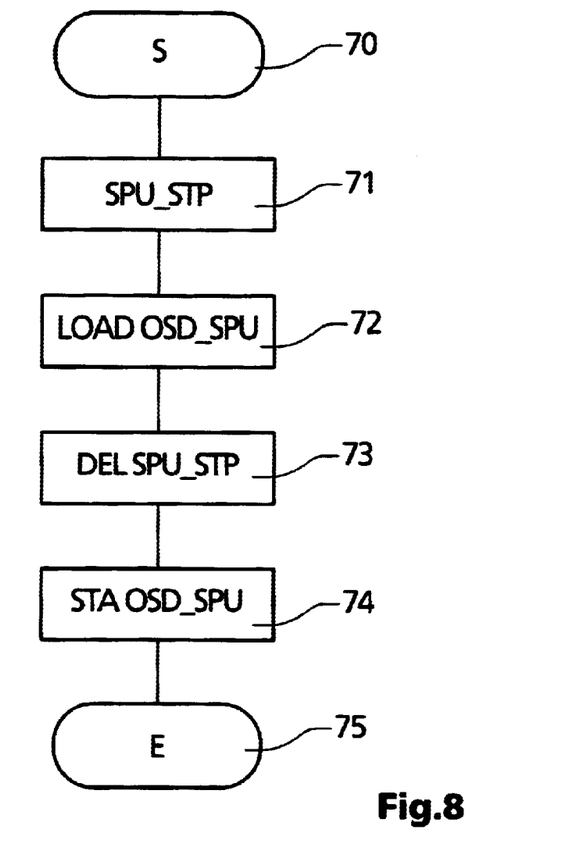
FIG. 8 shows a flow diagram for a program for controlling the subpicture decoding device in accordance with the first solution according to the invention.

FIG. 8 now illustrates the flow diagram for the control of the subpicture decoding unit 45 on the part of the microcontroller 54. The reference numeral 70 designates the program start. The reference numeral 71 designates a program step in which the current subpicture unit in the subpicture decoding device is stopped. The reference numeral 72 designates a program step in which the new subpicture unit for the insertion of the status information or of the operating menu is loaded into the subpicture decoding device 45. The reference numeral 73 designates a program step in which a register location which was previously set in program step 71 is cleared again. The reference numeral 74 designates a program step in which the newly loaded subpicture unit in the subpicture decoding device 45 is started. The program ends in program step 75.

Figure 9:
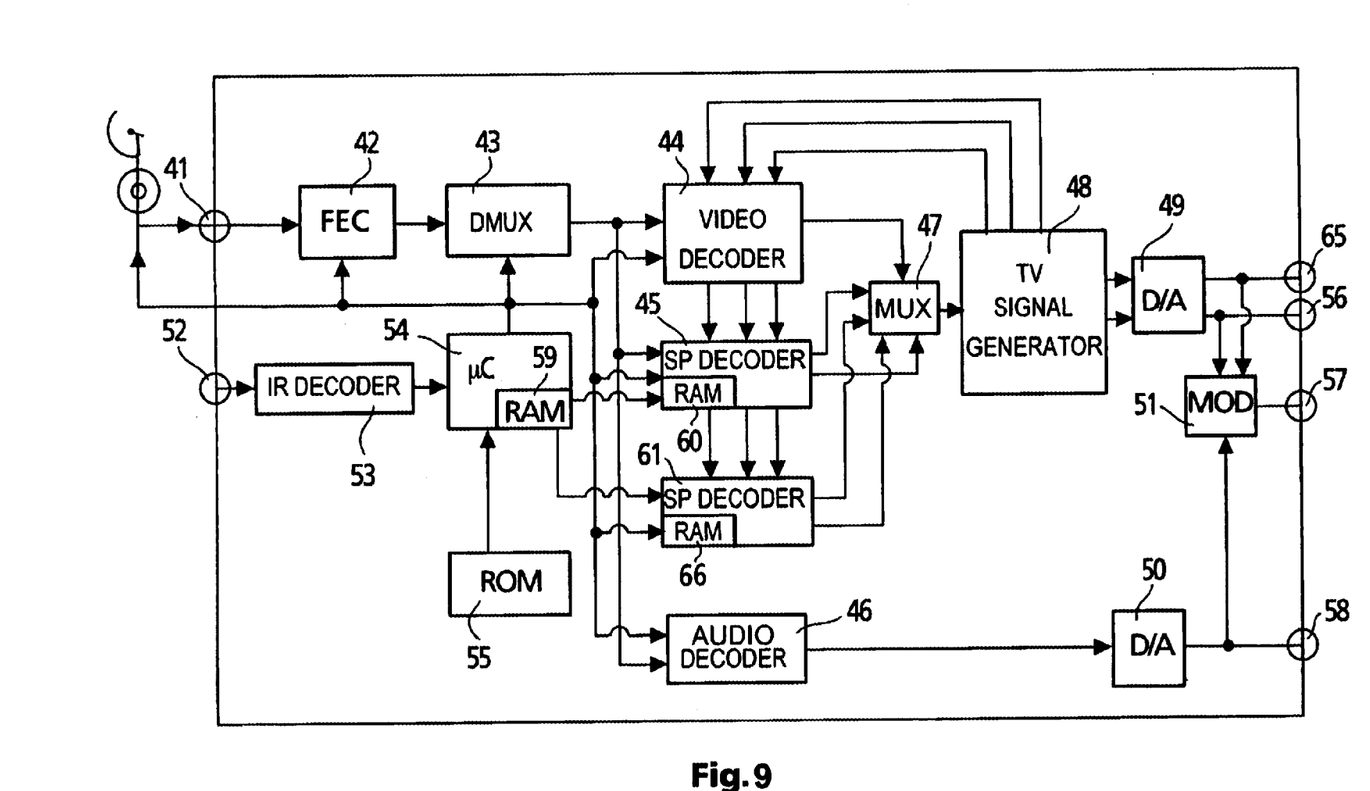
FIG. 9 shows a block diagram of the second solution according to the invention.

The exemplary embodiment of the second solution according to the invention will now be explained in more detail with reference to FIG. 9. In this case, the corresponding reference numerals in FIG. 9 in each case designate the same components as in FIG. 7. A second subpicture decoding device 61 is additionally provided. The second subpicture decoding device 61 is likewise connected to the multiplexing unit 47. In addition, a control line leads from the second subpicture decoding device 61 to the multiplexing unit 47. The multiplexing unit 47 is thus controlled by both subpicture decoding units 45 and 61. If a command for the insertion of a status information item or of an operating menu is now input into the microcontroller 54, then the microcontroller 54 reads the corresponding subpicture unit from the ROM 55 and loads the subpicture unit, possibly after completion, into the second subpicture decoding device 61. The subpicture unit is also started at the same time. The two subpicture decoding devices can each process their subpicture units separately and output the associated pixel data with correct timing to the multiplexing unit 47.

Figure 7:
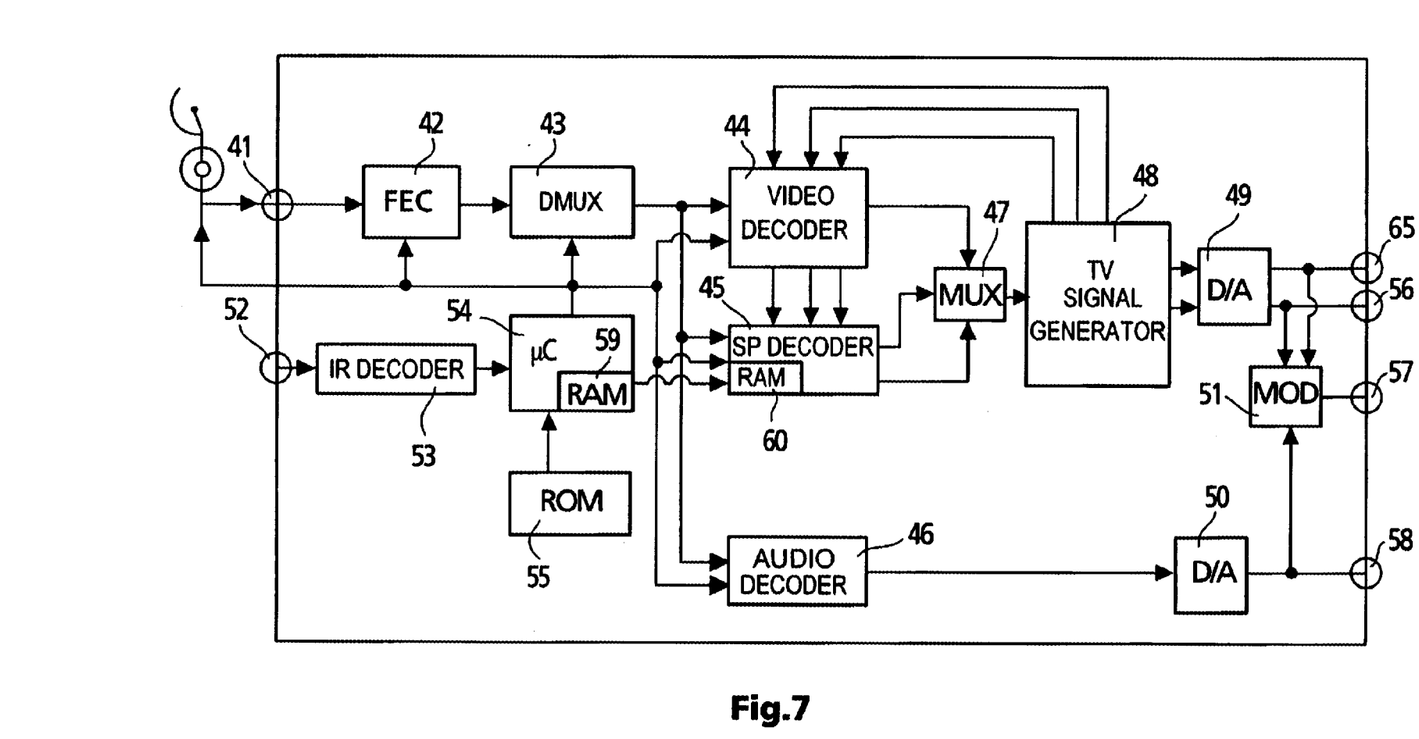
FIG. 7 shows a block diagram of the first apparatus according to the invention.
Figure 10:
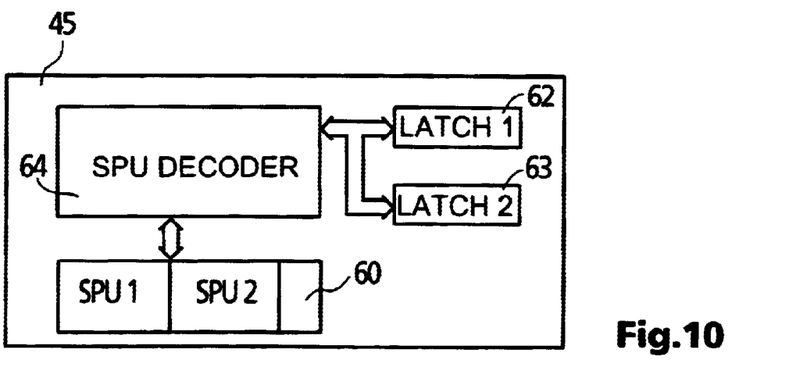
FIG. 10 shows a refined block diagram of the subpicture decoding unit in accordance with the third solution according to the invention.

An alternative subpicture decoding device for the exemplary embodiment according to FIG. 7 is illustrated in FIG. 10, where the subpicture decoding device illustrated is designed in such a way that it can process two different subpicture units in parallel. For this purpose, it has provided sufficient memory space for two subpicture units SPU1 and SPU2 in the RAM 60. In addition, two buffer stores 62 and 63 are provided to which decoded data can be written. The actual decoding unit 64 firstly decodes the data of the subpicture unit SUP1. In the process, it writes the decoded data to the first buffer store 62. Subsequently, this decodes the second subpicture unit SPU2 and writes the associated data to the second buffer store 63. Depending on the status of the horizontal and vertical sync signals and also of the pixel clock signal, the decoded data are then read either from the first or second buffer store. In this case, the decoding unit 64 must operate at a speed high enough that the decoded data are already made available when the outputting of the data with reference to the pixel clock signal is demanded. However, this can always be achieved if picture-exact outputting of the subpicture units does not have to be observed, rather delayed outputting is sufficient, at least for the status information and on-screen operational menus.

The invention is not restricted to the exemplary embodiments described. Diverse alterations and modifications are possible. A simple subpicture decoding device can be designed such that it can generate only four colours. In this regard, reference is made to a subpicture decoding device which does not contain the special commands for the karaoke function, namely CHG_COLCON, as specified in the DVD standard. Although such a subpicture decoding device can generate only four colours for the subpicture per frame, that has the advantage that the hardware outlay for the subpicture decoding device is kept low.

It is also possible to provide an expanded subpicture decoding device, which is expanded in such a way that it can process subpicture units having a maximum size of 64 Kbytes instead of 53,220 bytes in accordance with the DVD standard. In that case, such a subpicture decoding device can also generate more complicated subpicture units than is possible with the subpicture decoding devices in accordance with the DVD Standard Version 1.0. The requisite additional hardware outlay remains low.

In a further implementation, it is also possible to design a subpicture decoding device in such a way that it uses relative pointers having a length of 32 bits instead of the relative pointers having a length of 16 bits in accordance with the DVD Standard. Such a subpicture decoding device would be able to process subpicture units up to a size of 4,294,967,296 bytes. In this case, a higher resolution for the subpictures would then also easily be possible.

What is claimed is:

1. Apparatus for generating a digital video picture having a main picture with a subpicture and a secondary picture containing apparatus status information, comprising:

a demultiplexing device for separating a bit stream into a main-picture bit stream and a subpicture bit stream;

a first decoding unit for decoding the main-picture bit stream;

a second decoding unit for decoding the subpicture bit stream; and, a multiplexing device for outputting decoded data from the first and second decoding units for concurrent display in the video picture, where, in response to a command the second decoding unit halts ceases decoding the subpicture bit stream and initiates decoding apparatus status information data as the secondary picture.

2. Apparatus according to claim 1, comprising a storage device containing apparatus status information data coded in accordance with the subpicture data.

3. Apparatus according to claim 1, wherein the secondary picture data, coded in accordance with the subpicture data is stored within the second decoding unit.

4. Apparatus according to claim 1, comprising a storage device containing the of apparatus status information and an on screen display menu data coded in accordance with the subpicture data.

5. An Apparatus for generating a digital video picture, having a main picture with a subpicture and a secondary picture, the secondary picture representing one of apparatus status information and on screen display menu, comprising:

a demultiplexing device for separating an input bit stream into a main-picture bit stream and a subpicture bit stream;

a first decoding unit for decoding the main-picture bit stream consisting of compressed data representing the main picture;

a second decoding unit for decoding compressed data of the subpicture bit stream;

a third decoding unit for decoding compressed data representative of the secondary picture; and, a multiplexing device for outputting in a timed sequence, data decoded from the first, second and third decoders for concurrent presentation in the video picture;

wherein the compressed data representing the subpicture and the secondary picture are coded with substantially similar rules and with the same format as the subpicture bit stream, the second and third decoding units are correspondingly substantially similarly.

6. The apparatus of claim 5, comprising a storage device, containing compressed data representative of the secondary picture.

7. The apparatus of claim 6, wherein the second decoding and third decoding units are combined to form a common decoding unit for successively decoding the subpicture and secondary picture data for timed insertion in the main picture data by the multiplexing device.

8. Apparatus for generating a digital video picture having a main picture with a subpicture and a secondary picture containing one of apparatus status information and an on screen display menu, comprising:

a demultiplexing device for separating a bit stream into a main-picture bit stream and a subpicture bit stream;

a first decoding unit for decoding the main-picture bit stream;

a second decoding unit for decoding the subpicture bit stream; and, a multiplexing device for outputting decoded data from the first and second decoding units for concurrent display in the video picture, where, in response to a command the second decoding unit halts decoding the subpicture bit stream and initiates decoding one of apparatus status information and on screen display menu data as the secondary picture.

* * * * *